No. 740,699. PATENTED OCT. 6, 1903.
R. SCHRADER.
MACHINE FOR THE MANUFACTURE OF MOLASSES FODDER.
APPLICATION FILED OCT. 30, 1902.
NO MODEL.

WITNESSES
H. M. Kuehne
J. M. Dowling

INVENTOR
Rudolph Schrader

By Richardson
ATTORNEYS

THE NORRIS PETERS CO., PHOTO-LITHO., WASHINGTON, D. C.

No. 740,699. Patented October 6, 1903.

UNITED STATES PATENT OFFICE.

RUDOLPH SCHRADER, OF HAMBURG, GERMANY, ASSIGNOR TO ERNST SALOMONSOHN, OF HAMBURG, GERMANY.

MACHINE FOR THE MANUFACTURE OF MOLASSES FODDER.

SPECIFICATION forming part of Letters Patent No. 740,699, dated October 6, 1903.

Application filed October 30, 1902. Serial No. 129,469. (No model.)

*To all whom it may concern:*

Be it known that I, RUDOLPH SCHRADER, a resident of the city of Hamburg, State of Hamburg, in the Empire of Germany, have invented new and useful Improvements in Machines for the Manufacture of Molasses Fodder, of which the following is a specification.

The present invention relates to a machine for the manufacture of molasses fodder and allows automatically of an exact regulation of the feed of the substances to be mixed in order to produce an evenly good product.

Figure 1:
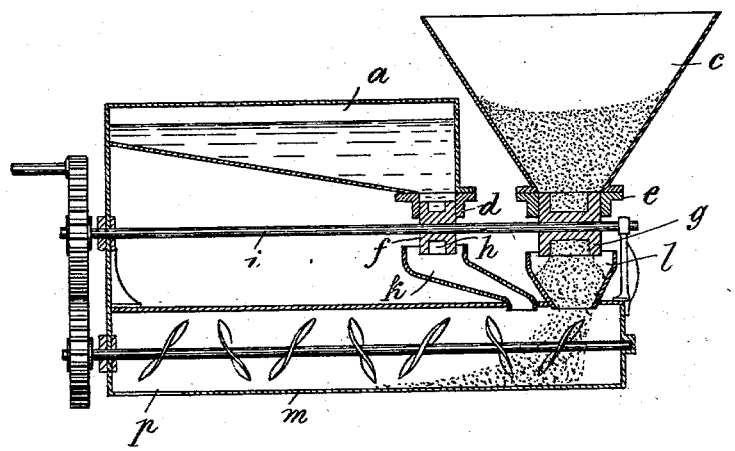
Figure 2:
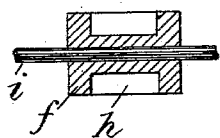
Figure 3:
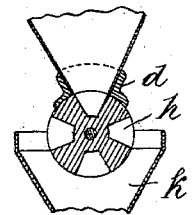

Figure 1 is a sectional elevation of the machine; Fig. 2, a longitudinal section, on an enlarged scale, of the molasses-measuring drum; Fig. 3, a cross-section of the measuring-drum for solid absorbents in combination with the feed and discharge hoppers; and Fig. 4, a longitudinal section, on an enlarged scale, of the measuring-drum with a device for decreasing or increasing the measuring-compartment proper.

The molasses is contained in a pan or vessel $a$, whereas the solid absorbents are contained in a hopper $c$. At the lower end of the pan $a$ there is a casing $d$, and at the lower part of the hopper $c$ there is a casing $e$, in the former of which a drum $f$ and in the latter a drum $g$ fit in such a way as to form a tight joint. These small drums are shown in detail in Figs. 2 and 3. They have several chambers or compartments $h$, the size of which corresponds to the amount of the different materials required—that is to say, is suited to the proportion in which the substances are to be mixed. The casings $d$ and $e$ inclose the drums also on the periphery in such a way that they entirely shut off that chamber which is to be filled.

A shaft $i$, on which the two feed-drums are mounted, is set in slow rotation when the machine is at work. At each revolution then each of the chambers of the drums draws automatically from its storage-receptacle an exactly-measured quantity of molasses or solid absorbents, respectively, in order to allow them to then pass through discharge-hoppers $k$ or $l$, respectively, into the mixing-drum $m$, whence the finished final product is discharged through an opening $p$.

Figure 4:
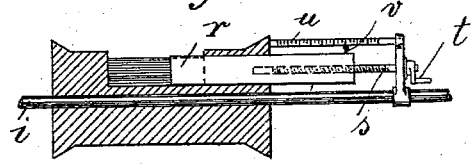
Figure 4:
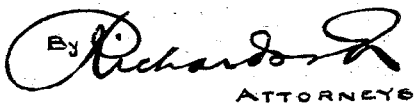

The alteration in the proportion between molasses and solid absorbents can be regulated better and more accurately by the device illustrated in Fig 4. A solid closing piece or block $r$ is introduced from one side into the drum in such a manner that it can be moved to and fro, whereby the contents of the measuring-chamber can be wholly or partially closed, while on withdrawing the closing piece or block $r$ the total contents of the measuring-chamber can be emptied into the hopper. The closing piece or block $r$ is connected with a screw $s$, fixed on a framework, so that by turning the handle of the crank $t$ the closing-piece can be introduced into the chamber or withdrawn from it at will. A scale $u$ and a finger $v$ readily indicate the position of the closing-piece within the measuring-chamber. This finger and scale constitute an indicator.

Having now particularly described and ascertained the nature of my said invention and in what manner the same is to be performed, I declare that what I claim is—

In combination with a feed-hopper, a drum to receive the material from the hopper, said drum having a chamber, a block movable in said chamber, a screw for moving the block and an indicator on the outside of the drum having a part connected to the closing-block for indicating the position of the block within the chamber, substantially as described.

In witness whereof I have hereunto set my hand in presence of two witnesses.

RUDOLPH SCHRADER.

Witnesses:
E. H. L. MUMMENHOFF,
T. CHRIST. HAFERMANN.